US007058720B1

(12) United States Patent
Majidimehr (10) Patent No.: US 7,058,720 B1
(45) Date of Patent: *Jun. 6, 2006

(54) GEOGRAPHICAL CLIENT DISTRIBUTION METHODS, SYSTEMS AND COMPUTER PROGRAM PRODUCTS

(75) Inventor: Amir Majidimehr, Los Altos, CA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,767

(22) Filed: Jun. 30, 1997

(51) Int. Cl.
*G06F 15/16* (2006.01)

(52) U.S. Cl. ........................ 709/231; 709/217; 709/219; 709/220; 709/221

(58) Field of Classification Search ............ 395/200.33, 395/200.49, 200.47, 200.48, 200.61; 707/10, 707/3, 101; 111/144; 348/7, 12; 709/203, 709/105, 202, 219, 217, 218, 231, 239, 221, 709/222, 232, 220, 223
See application file for complete search history.

(56) References Cited

U.S. PATENT DOCUMENTS 5,019,910 A  *  5/1991  Filmer ........................ 348/726
5,208,665 A  *  5/1993  McCalley et al. ............ 348/12

(Continued)

FOREIGN PATENT DOCUMENTS

WO    WO-97/11429    *  3/1997

OTHER PUBLICATIONS

Baentsch et al., "Introducing Application–Level Replication and Naming into today's Web", Fifth International WWW Conference Copyright 1996.*
Malpani et al., Making WWW Caching Servers Cooperate.*
Amir, E., et al., "An Application Level Video Gateway", *ACM Multimedia*, pp. 1–10, (Nov. 1995).
Chaddha, N., et al., "An end to end software only scalable video delivery system", *Proceedings Networks and Operating System Support for Digital Audio and Video*, pp. 130–141, (Apr. 21, 1995).
McCanne, S., et al., "vic: A Flexible Framework for Packet Video", *ACM Multimedia*, pp. 1–12, (Nov. 1995).

*Primary Examiner*—William C. Vaughn, Jr.
(74) *Attorney, Agent, or Firm*—Lee & Hayes, PLLC (57) ABSTRACT

Video or media content is transferred to a local video or media server by a system administrator or central content programmer. Client data processing modules, i.e., client machines, are configured to query for local content associated with a particular file and stream names. The local search replaces the original stream name with a stream name associated with a local area network. The modified configuration file of the client machines provisionally substitutes a local stream name for the original stream name linked to the central media server. If a local query script searching for selected content locally, results in an error response indicating the requested content is unavailable locally, then the provisional stream name is deleted and replaced with the original stream name. The original stream request for selected content, which was made to the central media or video server is accordingly implemented as a fallback.

27 Claims, 8 Drawing Sheets

U.S. PATENT DOCUMENTS

| | | | | |
|---|---|---|---|---|
| 5,253,275 A | * | 10/1993 | Yurt et al. | 348/7 |
| 5,341,477 A | * | 8/1994 | Pitkin et al. | 709/203 |
| 5,487,167 A | | 1/1996 | Dinallo et al. | 395/650 |
| 5,511,208 A | * | 4/1996 | Boyles et al. | 709/223 |
| 5,568,181 A | * | 10/1996 | Greenwood et al. | 348/7 |
| 5,577,258 A | | 11/1996 | Cruz et al. | 395/800 |
| 5,594,911 A | | 1/1997 | Cruz et al. | 395/800 |
| 5,630,067 A | * | 5/1997 | Kindell et al. | 395/200.61 |
| 5,644,714 A | * | 7/1997 | Kikinis | 395/200.49 |
| 5,649,185 A | * | 7/1997 | Antognini et al. | 707/9 |
| 5,708,780 A | * | 1/1998 | Levergood et al. | 709/229 |
| 5,734,719 A | * | 3/1998 | Tsevdos et al. | 700/234 |
| 5,737,495 A | * | 4/1998 | Adams et al. | 395/200.61 |
| 5,751,956 A | * | 5/1998 | Kirsch | 709/203 |
| 5,754,830 A | * | 5/1998 | Butts et al. | 395/500.44 |
| 5,774,660 A | * | 6/1998 | Brendel et al. | 395/200.33 |
| 5,787,472 A | * | 7/1998 | Dan et al. | 711/134 |
| 5,802,299 A | * | 9/1998 | Logan et al. | 709/218 |
| 5,802,301 A | * | 9/1998 | Dan et al. | 709/223 |
| 5,805,803 A | * | 9/1998 | Birrell et al. | 713/201 |
| 5,805,804 A | * | 9/1998 | Laursen et al. | 709/223 |
| 5,812,769 A | * | 9/1998 | Graber et al. | 709/228 |
| 5,819,048 A | * | 10/1998 | Okazaki et al. | 709/223 |
| 5,828,847 A | * | 10/1998 | Gehr et al. | 709/229 |
| 5,835,718 A | * | 11/1998 | Blewett | 395/200.48 |
| 5,838,916 A | * | 11/1998 | Domenikos et al. | 709/219 |
| 5,841,980 A | * | 11/1998 | Waters et al. | 709/204 |
| 5,867,706 A | * | 2/1999 | Martin et al. | 709/105 |
| 5,898,456 A | * | 4/1999 | Wahl | 725/91 |
| 5,913,033 A | * | 6/1999 | Grout | 709/219 |
| 5,933,835 A | * | 8/1999 | Adams et al. | 707/10 |
| 5,937,159 A | * | 8/1999 | Meyers et al. | 713/201 |
| 5,941,954 A | * | 8/1999 | Kalajan | 709/239 |
| 5,956,521 A | * | 9/1999 | Wang | 710/35 |
| 5,956,716 A | * | 9/1999 | Kenner et al. | 707/10 |
| 5,959,945 A | * | 9/1999 | Kleiman | 340/5.74 |
| 5,963,915 A | * | 10/1999 | Kirsch | 705/26 |
| 5,974,549 A | * | 10/1999 | Golan | 713/200 |
| 5,983,005 A | * | 11/1999 | Monteiro et al. | 709/231 |
| 5,991,306 A | * | 11/1999 | Burns et al. | 370/429 |
| 5,991,809 A | * | 11/1999 | Kriegsman | 709/226 |
| 6,003,030 A | * | 12/1999 | Kenner et al. | 707/10 |
| 6,003,087 A | * | 12/1999 | Housel, III et al. | 709/229 |
| 6,009,459 A | * | 12/1999 | Belfiore et al. | 709/203 |
| 6,014,707 A | * | 1/2000 | Miller et al. | 709/232 |
| 6,049,820 A | * | 4/2000 | Murphy, Jr. et al. | 709/203 |
| 6,065,043 A | * | 5/2000 | Domenikos et al. | 709/203 |
| 6,112,239 A | * | 8/2000 | Kenner et al. | 709/224 |
| 6,119,234 A | * | 9/2000 | Aziz et al. | 713/201 |
| 6,128,653 A | * | 10/2000 | del Val et al. | 709/203 |
| 6,151,632 A | * | 11/2000 | Chaddha et al. | 709/231 |
| 6,151,634 A | * | 11/2000 | Glaser et al. | 709/236 |
| 6,154,777 A | * | 11/2000 | Ebrahim | 709/227 |
| 6,161,137 A | * | 12/2000 | Ogdon et al. | 709/224 |
| 6,163,795 A | * | 12/2000 | Kikinis | 709/203 |
| 6,173,317 B1 | * | 1/2001 | Chaddha et al. | 345/723 |
| 6,185,598 B1 | * | 2/2001 | Farber et al. | 709/200 |
| 6,237,031 B1 | * | 5/2001 | Knauerhase et al. | 709/221 |
| 6,253,188 B1 | * | 6/2001 | Witek et al. | 705/14 |
| 6,370,571 B1 | * | 4/2002 | Medin, Jr. | 709/202 |

\* cited by examiner

GEOGRAPHICAL CLIENT DISTRIBUTION METHODS, SYSTEMS AND COMPUTER PROGRAM PRODUCTS

TECHNICAL FIELD

The field of the present invention relates to geographical client distribution methods, systems and computer program products, and more particularly to enabling ready user transparent access to streamed media content originating from a geographically remote site.

BACKGROUND OF THE INVENTION

Video and media streaming from a geographically remote server is technologically problematic and difficult to accomplish in a user optimal fashion. Placing the media content to be streamed at a far-removed location of a wide area network or the world wide web (www) results in a complex and time consuming traversal through a large number of data processing nodes, when a user requests streamed access to the media sought for real-time presentation of the content, whether it is audio content or video content, or some other kind of multimedia content. The user desiring a video or media presentation or performance makes a video- or media-specific file request by specifying a stream and file name to the remote server. If the path is broken, an error message is returned and no media presentation occurs. Even if the path is secure, the presentation may be delayed undesirably.

To avoid technical problems such as delays and inadvertent media terminations, a media entity may choose to employ a plurality of media servers which may be geographically distributed close to clients requesting media presentations. A request to stream particular media may then provoke a response which provides the user with a palette of media server choices for service from any of a number of geographically specific locations. Unfortunately, the user has no way of anticipating prior to the streaming request, whether a particular location of a server provides improved media access and presentation. Such anticipation is impossible, because geographically proximate server may be more heavily loaded and thus slower than a lower loaded server in another country situated in another time zone which lies in the evening hours, for example. Accordingly, the user has only the appearance of a choice, because there is no meaningful criterion which may be exercised by which the user can determine whether the choice made is likely to produce enhanced media streaming service.

It is accordingly desirable to make video and media streaming services more readily, more quickly and transparently available to the user.

SUMMARY OF THE INVENTION

According to one embodiment of the present invention, selected video or media content is transferred to or maintained at a local video or media server which is proximate or relatively proximate to the user, either geographically or in a local network context. According to another embodiment of the present invention, local transfer or placement of particular content is organized by a system administrator or central content programmer acting at a central media content server location. According to one embodiment of the present invention, particular selected content is saved or copied locally for a temporary time incident to a streaming event or presentation, whereby particular content which a user or client has requested of a central video or media server has been streamed to the user for real-time presentation. The streamed performance is then copied in a selected file in a local memory or disk, and then transferred to a local media server for future local streaming events and presentations within, for example, a local area network (LAN). Further, client data processing modules, i.e., client nodes, are configured according to the present invention to first search or query for the local presence and presentation availability of content associated with a particular file and stream names. The local search is facilitated by replacing the original stream name with a stream name associated with a local area network. According to one embodiment of the present invention, a media (e.g., video) or other web server tracks the volume and loading of stream content requests made by users and clients in samples or on a large scale. If the volume of a stream service for particular content exceeds a predetermined threshold, then a central content programmer identifies clients and local area client networks characterized as having high content streaming request rates as to the particular content. The content programmer further identifies local media servers. The central content programmer transmits popular selected media content to particular local media servers. Further, the central content programmer transmits configuration instructions to local area networks (LANs) to reconfigure selected or all client machines in the LAN by modifying their respective configuration files to first request content or media streaming from an applicable local media content server, and only if unsuccessful in achieving the desired media streaming, to query the originally indicated content server which is at a remote (to the local client machine and user) central media server location. The modified configuration file of the client machines is adapted, according to the present invention, to respond to user queries for particular media content identified by a particular file name, by provisionally substituting a local stream name for linkage with the requested file name which identifies desired media work. If the modified query script is locally implemented and results in an error response indicating the requested content is unavailable locally, then the provisional stream name is deleted and then replaced with the original stream name. The original stream request for selected content, which was made to the central media or video server is accordingly implemented as a fallback.

DETAILED DESCRIPTION OF A PREFERRED EMBODIMENT

Figure 1A:
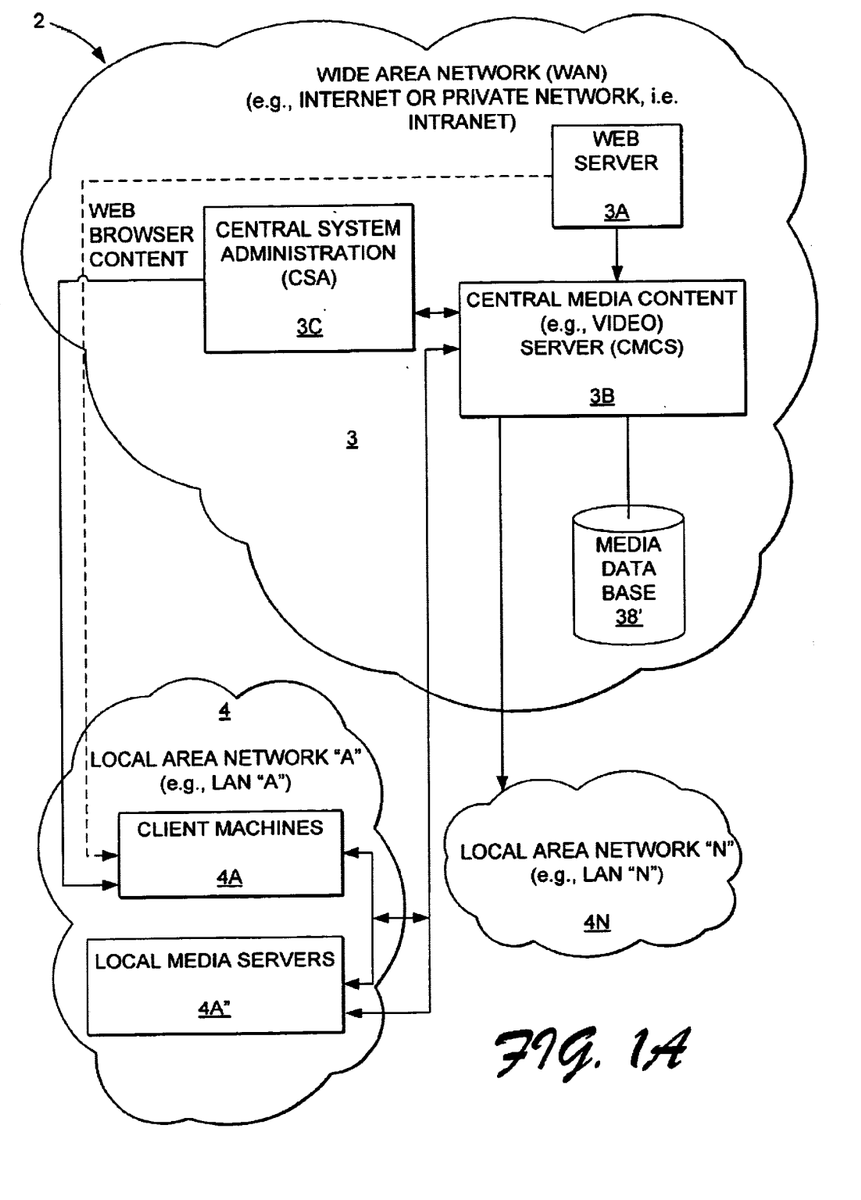
FIG. 1A is a system diagram of a geographically distributed media content delivery (GDMCD) system according to the present invention.

FIG. 1A is a system diagram of a geographically distributed media content delivery (GDMCD) system 2 according to the present invention. In particular, GDMCD system 2 includes a wide area network (WAN) 3 associated with a plurality of local area networks (LANs) 4A–4N for selective distribution of the time-variable media content. Alternatively, WAN 3 can be associated with selected regional networks. A regional network can be a local network, a metropolitan network, a WAN, or a selected arbitrary set of communicating machines. WAN 3, according to one embodiment of the present invention, is the Internet. Alternatively, WAN 3 may be a private network such as an intranet which is secured from public networks by a firewall (not shown). The WAN 3 includes at least a single web server 3A, a central media server 3B, and a system administration computer 3C. Central media server 3B is connected to a media data base 3B' which contains a predetermined collection of content and media works for downloading and streaming to client machines locally and at remote sites upon request. LAN 4A includes client machines 4A and a local media server 4A". The web server 3A downloads web pages to client machines 4A running web browsers. The web pages are provided as documents by web server 3A to browsers installed on client machines 4A, and they provide links to real time-variable media content, including real-time audio or video content. Such real-time video content is streamed to client machines 4A as a multimedia presentation. When the user clicks on a hypertext markup language (HTML) link in a document on a browser, a media server such as central media server 3B is invoked to stream the selected media content to the requesting one of client machines 4A". Predetermined media content from media data base 3B' is retrieved for real-time streaming to client machines 4A upon user request or for distribution and loading onto local media servers 4A". According to one embodiment of the present invention, a system administration computer (SYSADMIN) 3C or content programmer monitors requests for content according to particular content and kinds of content. According to the present invention, SYSADMIN 3C establishes policies and standards for downloading selected content by type and item to local media servers 4A". Distribution and loading of central media content can occur during off-peak hours at less than real-time streaming rates. Further, according to one embodiment of the present invention, SYSADMIN 3C sends system configuration commands to client machines 4A, to enable modification of installed configuration files in client machines 4A, so that when a user selecting an HTML link in a browser on a client machine which offers content by a central file and stream name, the central server stream name is replaced according to the present invention with a local stream name. Alternatively, an entire configuration file can be downloaded to client machines 4A to accomplish the reconfiguration. More particularly, the configuration changes can be communicated to the client by other means such as simply copying a file to it, or having the end-user manually configure his client software. For example, the user could go to a configuration menu in the client and manually enter the substitution string. According to another embodiment, the desired configuration methodology can be implemented using a number of different schemes ranging from the end user doing the work manually, to a fully automated scheme managed by a central administrator. According to one embodiment of the present invention, when the user clicks on an HTML link, the local media server is invoked in lieu of the central media server, by effect of the local server name substitution. According to another embodiment of the present invention, the substitution of the local server name is not contingent upon the results of a check as to whether the desired media content is actually available at the local server level. Instead, according to the present invention, the local client machine simply first requests the desired content, and if the desired content is not locally available, the local media server name substitution is reversed and the original pointer to the central media server is reestablished and implemented. Accordingly, client machines 4A can stream content from either central media content server 3B or a local media server 4A". According to one embodiment of the present invention, the system administration computer 3C effects a configuration modification as to client machines in LAN 4A causing the client machines to look first to local media servers for whatever content is sought to be streamed. According to another embodiment of the present invention, the system administration computer 3C effects a configuration modification as to client machines in LAN 4A causing the client machines to look first to local media servers only in the case of a particular kind or kinds of content are sought to be streamed. Downloading of particular content or types of content is undertaken according to a policy according to the present invention, if stream requests for a particular category of content exceed a threshold predetermined at some earlier time, e.g., relating to requests relating to a training video for a new software product being introduced at a geographical location remote from the central office, for example. Accordingly, SYSADMIN 3C arranges for central media server 3B to download an applicable folder or group of training videos to one or more media servers in a LAN at the local site. LAN "A" in FIG. 1A includes a plurality of client machines 4A' which are configured to receive and display or present media content on a predetermined window of a particular browser which has been installed on the client machine 4A. LAN "A" further includes one or more local media servers 4A" configured to stream real-time media content within LAN 4A. LAN manager is configured to manage and configure client machines 4A' and local media servers 4A" in LAN 4A, according to the present invention.

Figure 1B:
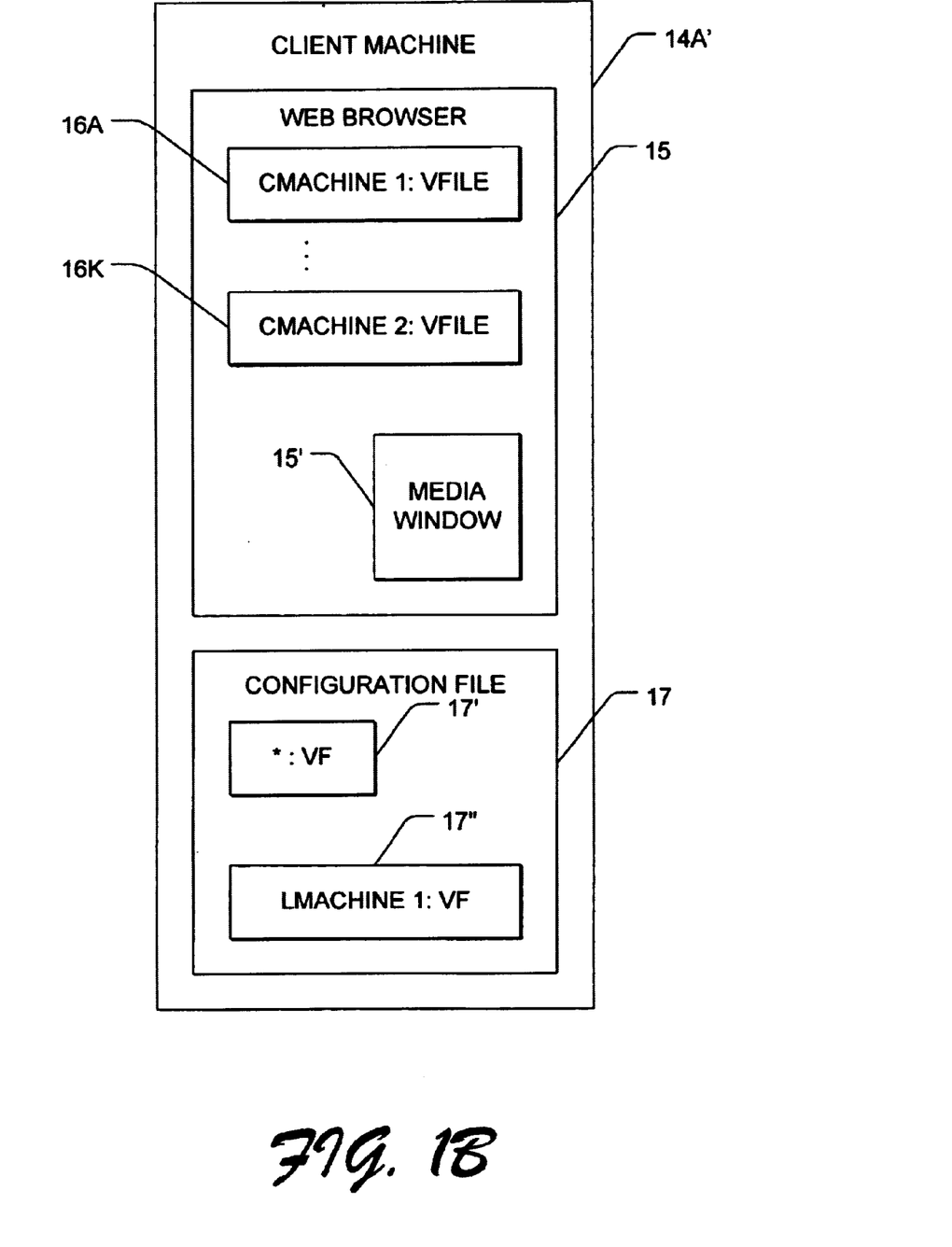
FIG. 1B is a block diagram of a client machine (CM) according to the present invention.

FIG. 1B is a block diagram of one embodiment of a client machine (CM) 14A' according to the present invention. CM 14A' includes a conventional web browser 15 and a configuration file 17 for the operation of CM 14A'. Web browser 15 is configured to receive web pages from a web server 3A, for example. The web pages received include HTML links 16A–16K specifying media server machines (i.e., stream names) and media content file names identifying particular media content which can be streamed for presentation at a media presentation window 15' which can be produced incident to activation of a plug-in provided to web browser 15. According to one embodiment of the present invention, configuration file 17 includes a search criteria 17' for a particular media file, e.g., "VF"; and at least a single local stream name 17" associated with a local media server in the LAN 4A. The local stream name is maintained for use within configuration file 17. According to the wild card search criterion 17' (*:VF), any stream request made for media presentation of file "VF" will be satisfied in the first instance by reference to a substituted steam name specific to local media server, LMACHINE1. According to another example, a stream request for performance of a video file available at a central server, central.com:VF, is satisfied by substitution of a video streamed at a local or regional media server, e.g., central.branch.com:VF. The request for streaming according to the present invention can be subject to nested substitution by one after another of an ordered series of putative media (e.g., video) files at corresponding media servers, e.g. central, branchn.com:VF. According to the present invention, once a media presentation file request is asserted by a user clicking on an associated HTML link, the stream name replacement specified in configuration file 17 is implemented, resulting in the predetermined local stream name, e.g., "LMACHINE1", being substituted for the original stream name found by wild card query and set in the web page document read by the user. Configuration file 17' is subject to modification according to one embodiment of the present invention, by LAN manager subject to control by SYSADMIN 3C of FIG. 1A. In particular, SYSADMIN 3C is effective for coordination of substitution details to ensure reference to a specific local media server to which it has or is likely to have sent content of interest to the user. According to one embodiment of the present invention, if the local media server fails and an error message is produced, then the original stream name and file name can be reinvoked to cause streaming from the central video server.

Figure 1C:
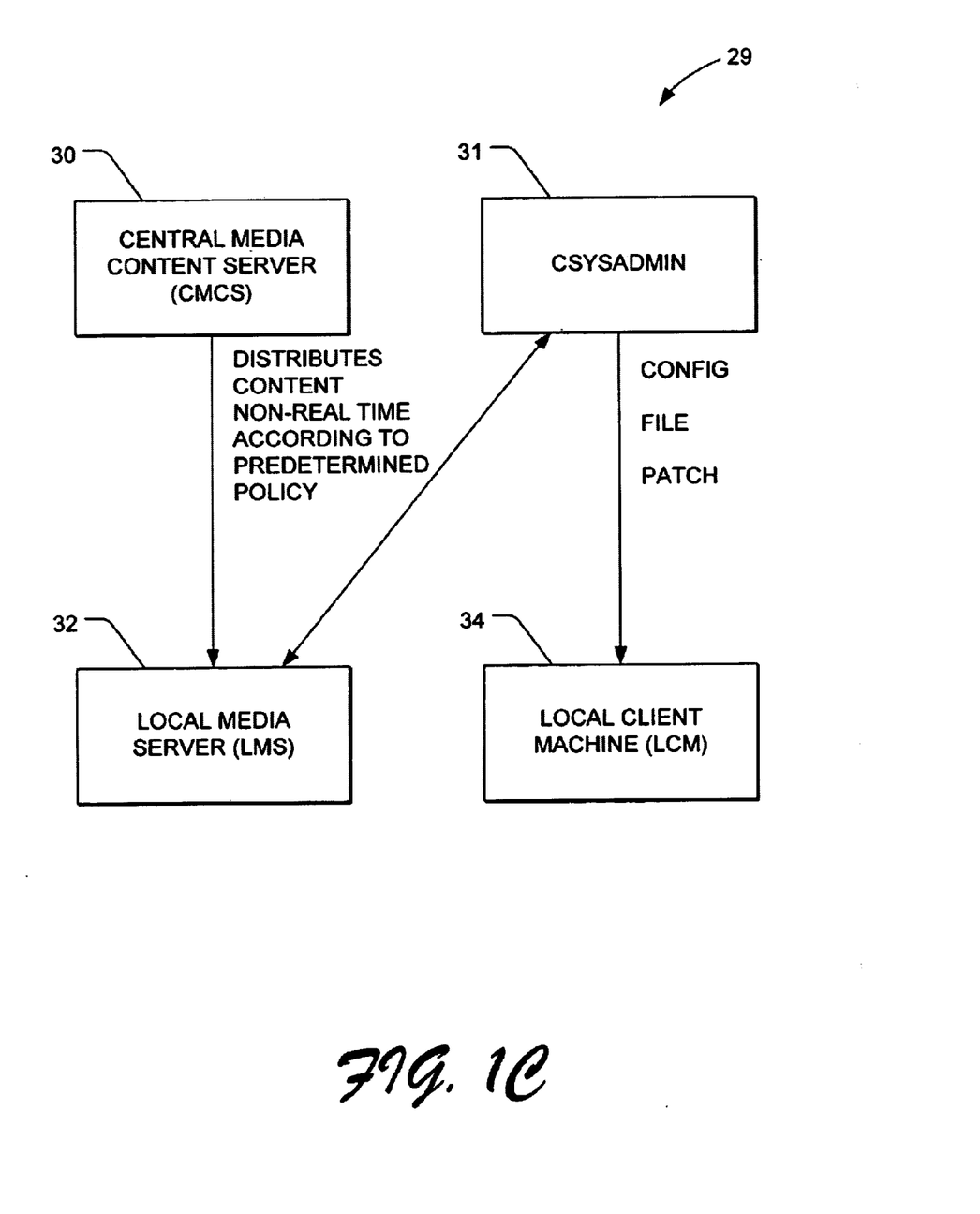
FIG. 1C is a block diagram of key network components active in implementing a method according to the present invention.

FIG. 1C is a block diagram of one embodiment of a geographically distributed real-time media content delivery (GTRMCD) system 29 for implementing a method according to the present invention. The GTRMCD system 29 includes a central media content server (CMCS) 30, a central system administration computer (CSAC) 31, a local media server (LMS) 32, and a local client machine (LCM) 34. CSAC 31 is connected in wired or wireless communication with the CMCS 30 to dispatch requested content according to a predetermined policy. LMS 32 selectively receives items or groups of media content for regional or local LAN streaming activities according to the present invention under direction of the CSAC 31 operating according the predetermined policies. LCM 34 receives modifications to LAN client machine configuration files for patching or modifying local client machine configuration files according to the present invention. LCM 34 is accordingly reconfigured according to the present invention to look to a local media server in the first instance for content specified in a web page as actually derivable for streamed presentation from a particular central media server.

Figure 1D:
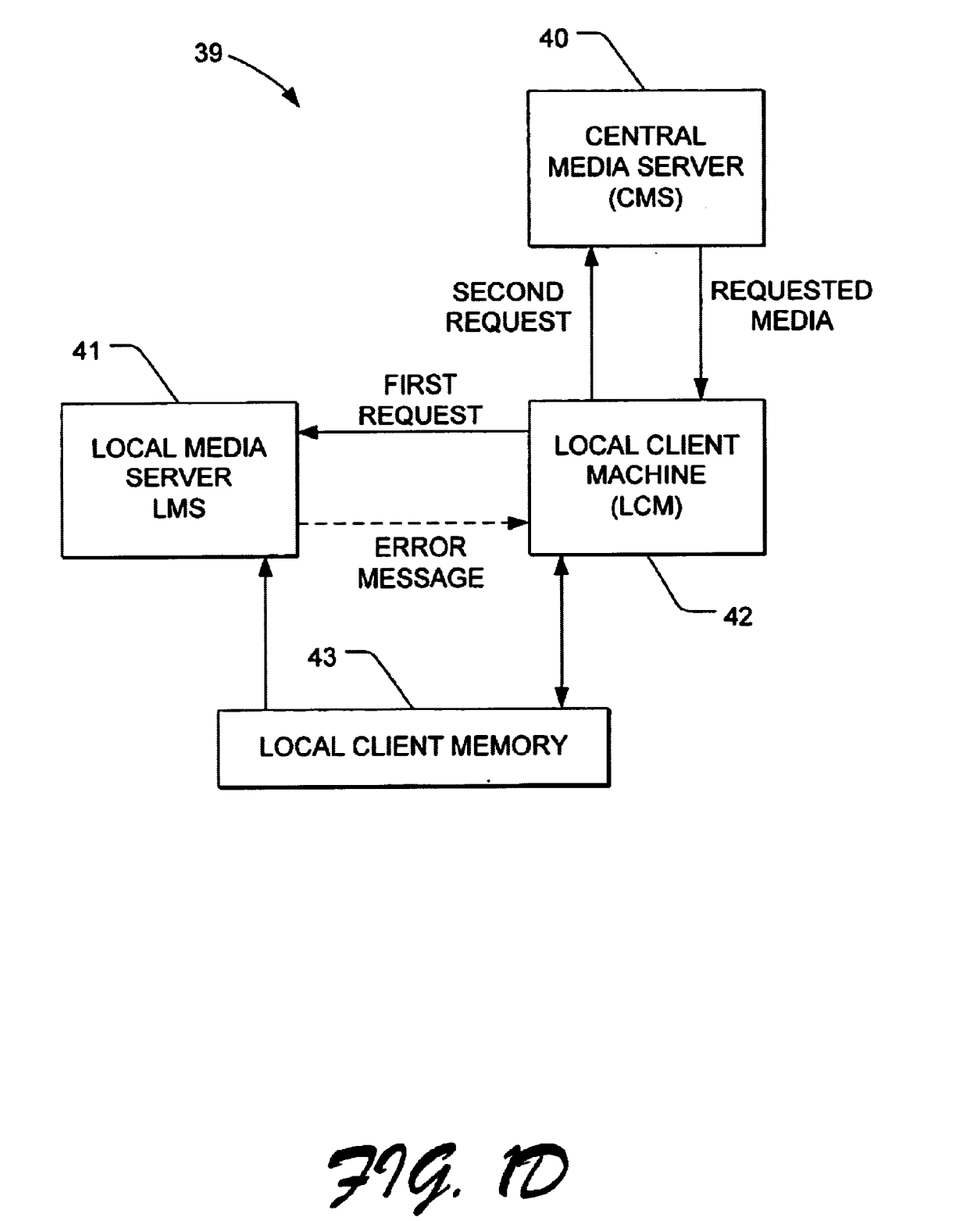
FIG. 1D is a block diagram of key network components in operation according to the present invention.

FIG. 1D is a block diagram of one embodiment of a geographically distributed real-time media content delivery (GTRMCD) system 39 in operation according to the present invention. The GTRMCD system 39 includes a central media content server 40, a local media server (LMS) 41, and a local client machine 42 having a web browser (not shown) and a media performance window (not shown) for performing real-time media content which is streamable from either the central media server or the local media server, according to the present invention. According to one embodiment of the present invention, the client machine 42 is configured to look first to the local media server for particular named content, irrespective of stream name or directory name, according to a first request (1). If the specified content is present or locally accessible to the local media server 41, local streaming is undertaken. If the local media server 41 is disconnected or otherwise dysfunctional, then an error message is sent to client machine 42. If an error message is received responsive to a first request, a subsequent or second request for streaming the related content is dispatched to the central media server 40 and the central media server returns the requested media in streaming operation dependent upon its stream and bandwidth capabilities. If the selected media is streamed from the central media server and it had not been available from the local content server, then according to the present invention, the streamed data is recorded in a client machine memory from where it is loaded, according to one embodiment of the present invention, into local media server 41 for satisfaction of local requests for the same content in accordance with the present invention.

Figure 2:
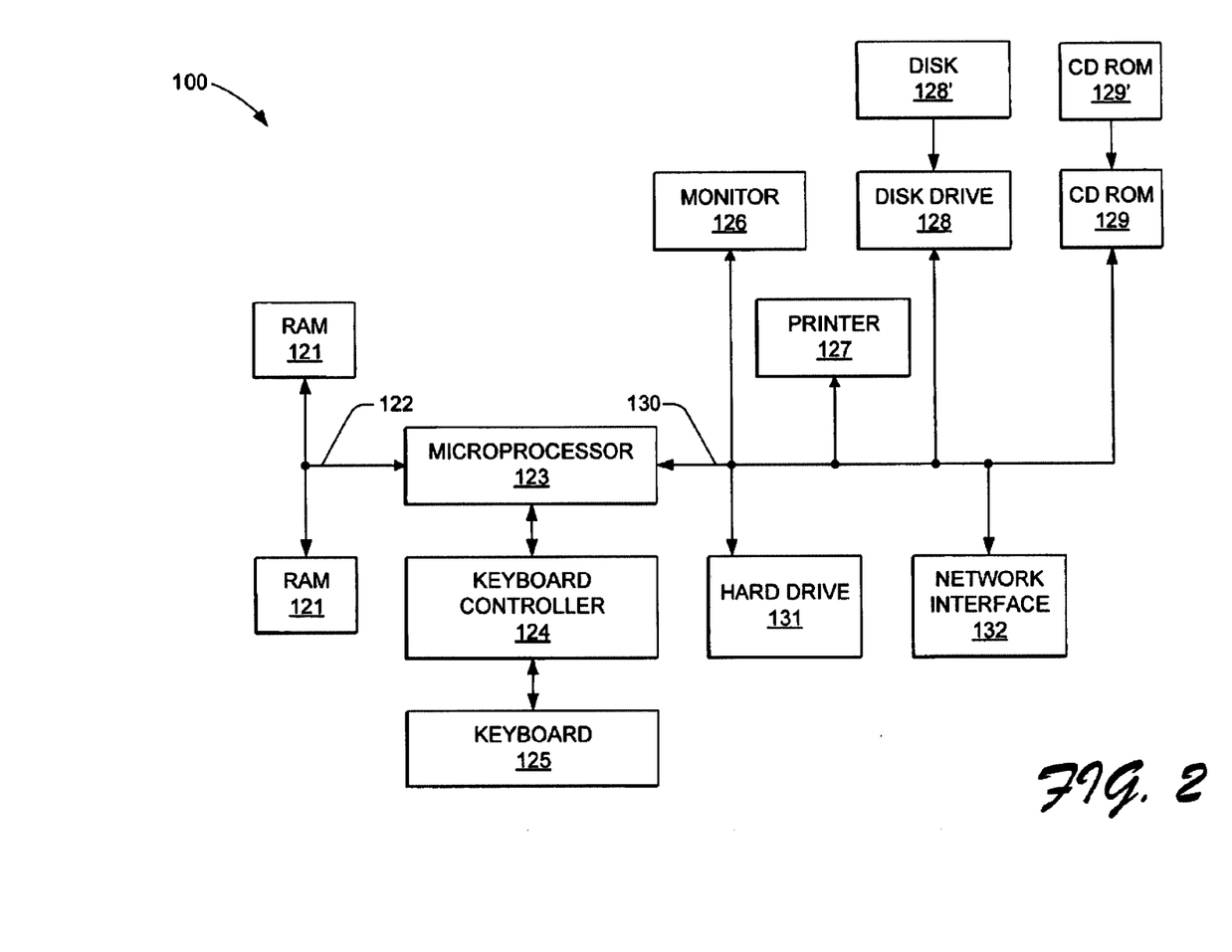
FIG. 2 is a block diagram of a computer system which can be used as a client computer for playing selected audio and video content in accordance with the present invention, or as a general purpose computer which can be adapted to serve as system administrator, a web server, or media server in accordance with the present invention.

FIG. 2 is a block diagram of a computer system 100 which can be used as a client computer for playing selected audio and video content in accordance with the present invention, or a system administrator, a web server, a LAN manager, or media server in accordance with the present system. Computer system 100 includes random access memory (RAM) 120, read only memory (ROM) 121, a memory bus 122 connected to RAM 120 and ROM 121, a microprocessor 123 connected to the memory bus 122, a monitor 126, a printer 127, a disk drive 128, a compact disk read only memory (CD ROM) drive 129, a peripheral bus 130 connected to monitor 126, printer 127, disk drive 128, and CD ROM drive 129; and a hard drive 131 and a network interface, both connected to peripheral bus 130. Disk drive 128 and CD ROM drive 129 are respectively able to read information including computer program products (not shown) which can be embedded on media such as, respectively, a magnetic or optical disk or floppy 128' and a CD ROM medium 129'. Depending upon the selected drive and medium, writing on the selected medium as well as reading can be accomplished.

Figure 3:
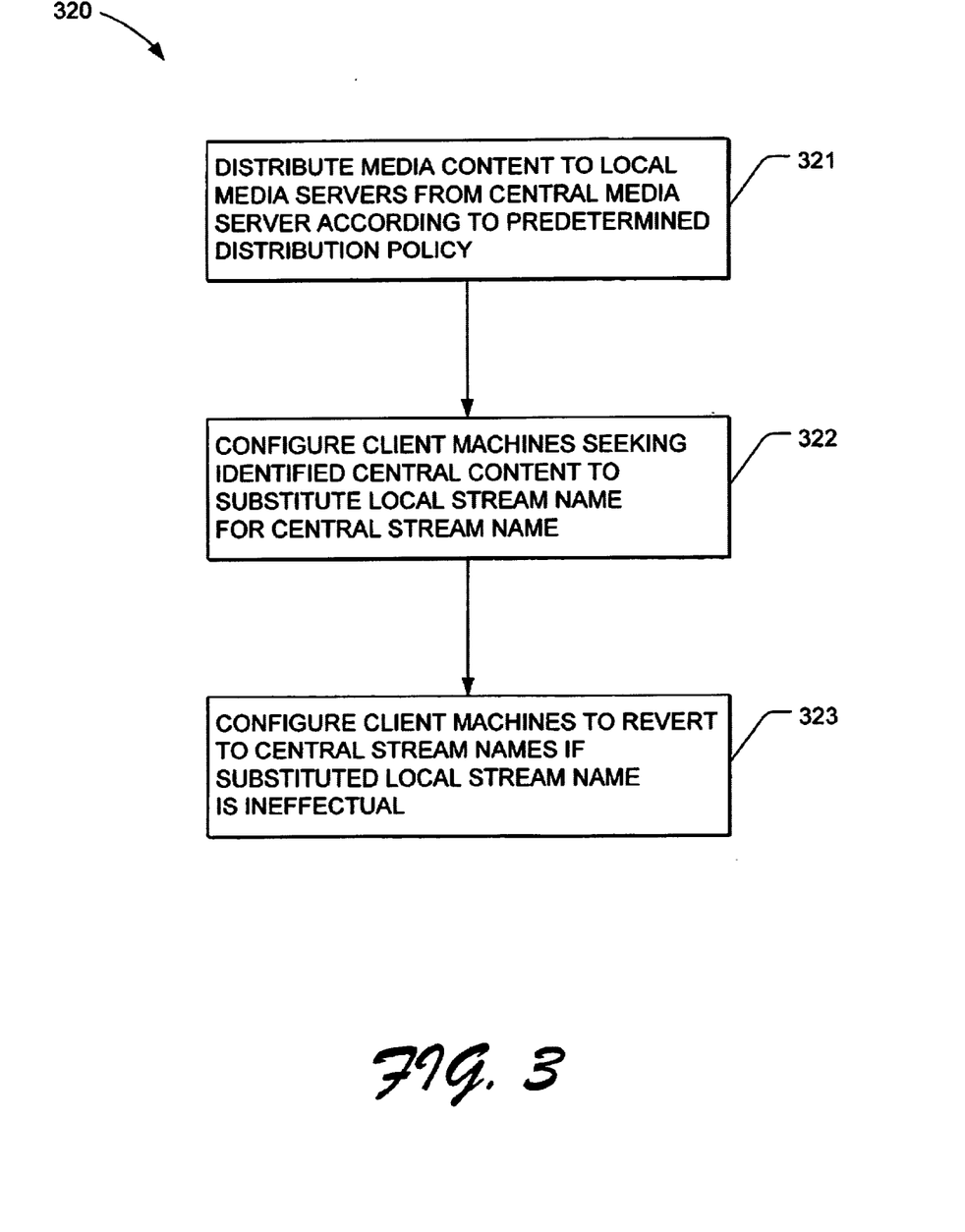
FIG. 3 is a flow chart of a method according to the present invention for distributing central content to distributed locations and reconfiguring local client machines to stream locally from the local client machines.
Figure 4:
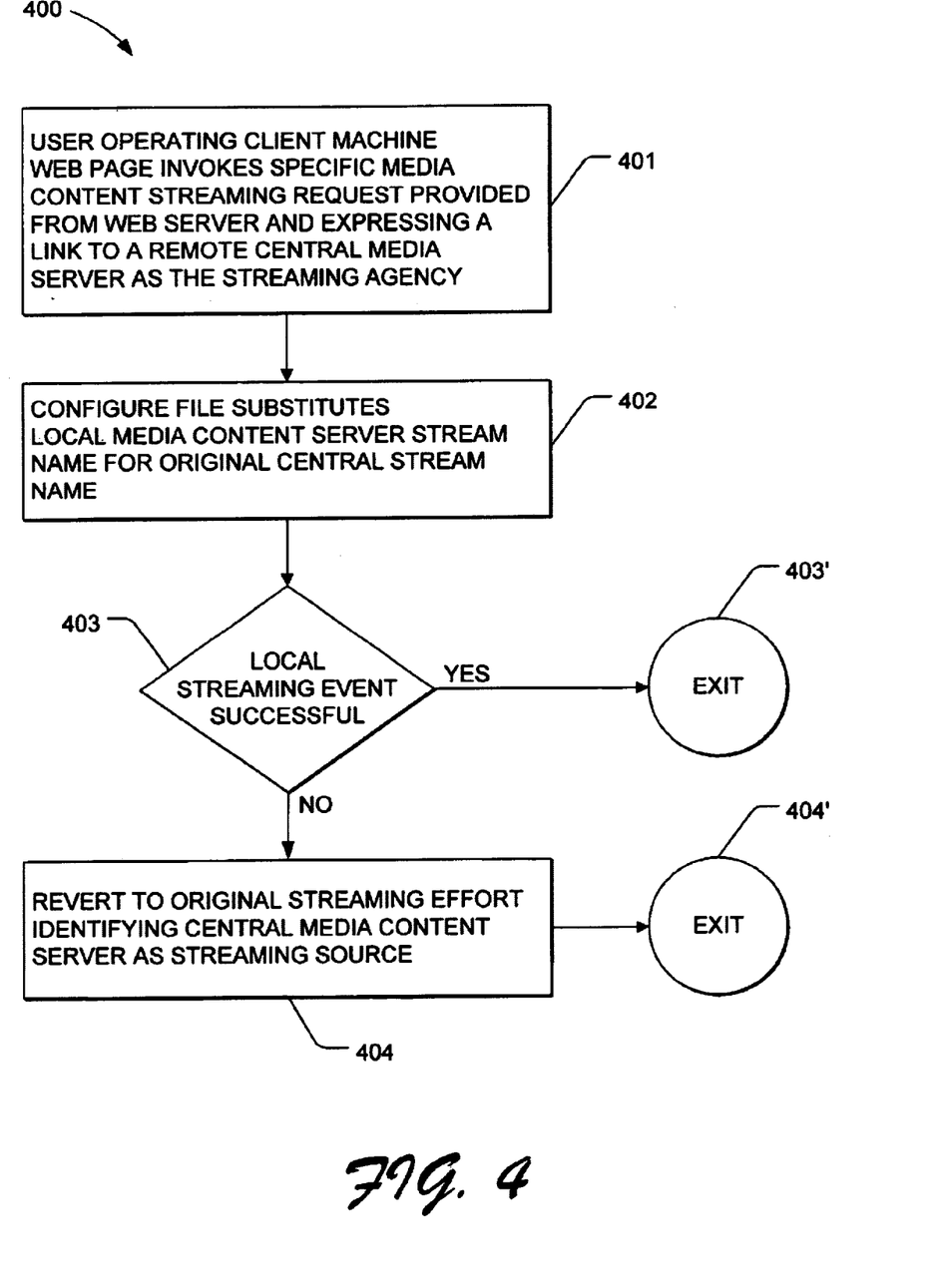
FIG. 4 is a flow chart of a method according to the present invention for attempting local streaming of selected real-time media content and if not successful reverting to an originally specified target streaming source which is remotely located at a wide area network location.

FIG. 3 is a flow chart of a method 320 according to the present invention for distributing central content to distributed locations and reconfiguring local client machines to stream locally from the local media servers. In particular, according to the present invention, media content is distributed 321 to all or particular local media servers from a central media server according to a predetermined distribution policy. The method 320 according to the present invention further includes configuring 322 client machines seeking identified control media content to substitute a local stream name for a central stream name, when requesting desired real-time media content. The method 320 according to the present invention additionally includes configuring 323 client machines to revert to central stream names, if the substituted local stream name is ineffectual and does not produce local media streaming in a client web browser environment, in particular in connection with the architecture of web browsers FIG. 4 is a flow chart of a method 400 according to the present invention for attempting local streaming of selected real-time media content and if not successful reverting to an originally specified target streaming source which is remotely located at a wide area network location. In particular, a user operating in a particular client machine web page document invokes 401 a specific media content streaming event by clicking on an applicable HTML link which identifies with a stream and file name particular specific desired real-time streamable content at a remote central wide area network media content server. According to one embodiment of the present invention, the local client machine reads its configuration file or queries a server and substitutes 402 a local media server name for the stream name provided in the web browser installed and running on the client machine and sends a message to the local media server to start streaming the specified content. In particular, the configuration data can be fetched in any one of a number of ways, according to the present invention. In particular, the data can come from a configuration file on a local machine, or configuration file from a remote machine or it can be queried from a server. The local browser has a plug in for effecting media streaming presentations in a specified window for users operating the browser software. In accordance with the present invention, a determination is made 403 whether the local streaming event has been successful. If the streaming event based upon local content has been successful, control exits 403. If the attempted local streaming event has been unsuccessful, operation continues with a reversion 404 to the originally specified streaming source and thereafter control exits 404. According to the present invention, the local client machine does not check to see if the content is available locally. Instead, it accomplishes a pattern match on the stream name. If there is a match, the local client machine attempts to fetch the stream from the substituted server. Only after this operation succeeds, does it know that the content is available locally.

Figure 5:
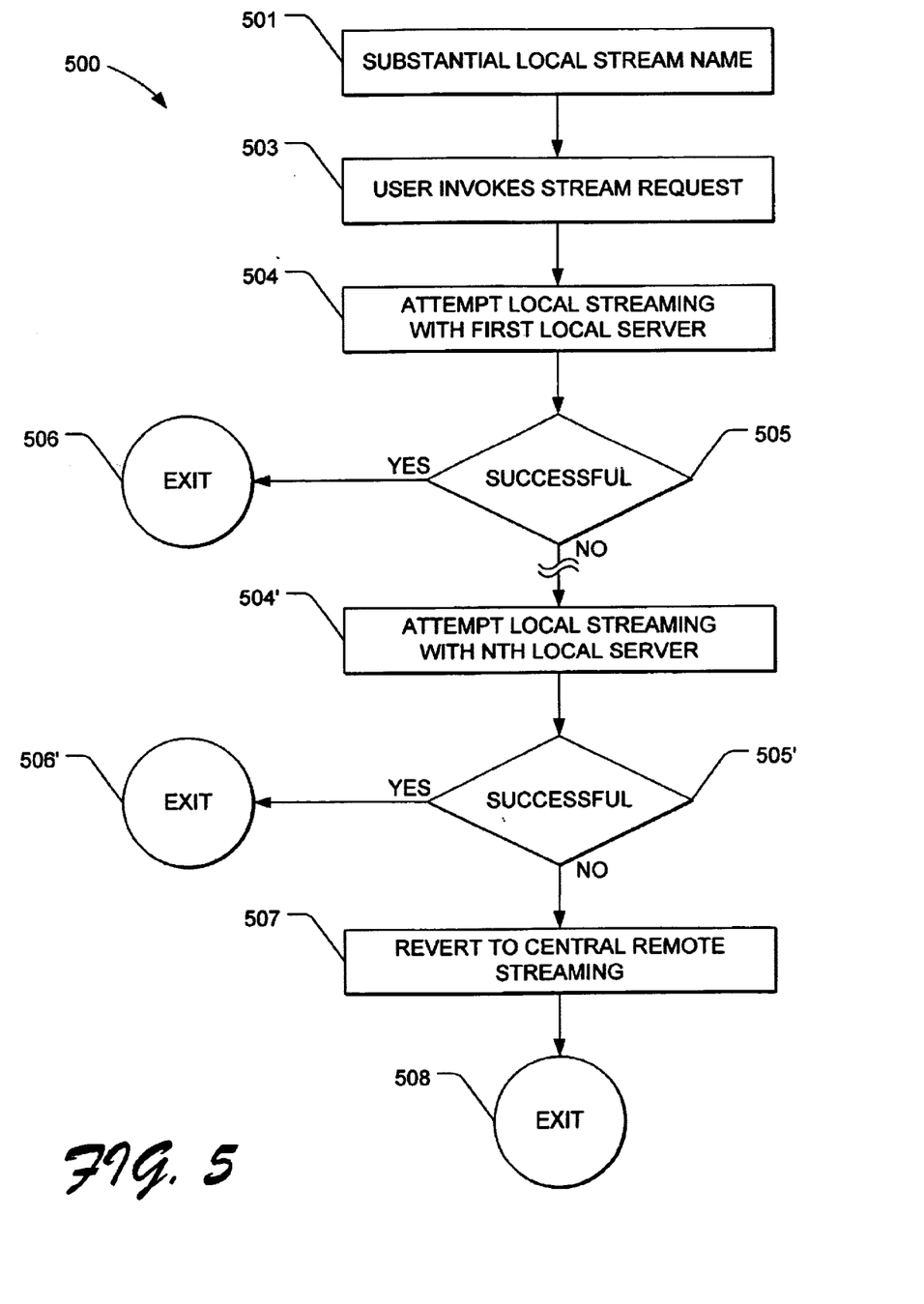
FIG. 5 is a flow chart of a method according to the present invention for attempting a local streaming event followed by a reversion to a central streaming source if local streaming has been unsuccessful.

FIG. 5 is a flow chart of a method 500 according to the present invention for attempting a local streaming event followed by a reversion to a central streaming source if local streaming has been unsuccessful. The local client machine translates 501 the web page content specification from its remote stream name to a local stream name. Then a user invokes 503 a streaming request. Then, local streaming is attempted 505. If local streaming has been successful 505, control exits 506. If local streaming has not been successful, or if the specified content was not found to have been locally available, then streaming is attempted at an originally specified remote streaming source, by reversion 507 to an original stream name in lieu of the substituted local media server name. Alternatively, local streaming is again attempted 504' for up to "n" cycles, and if a next attempt to stream locally is successful 505', control exits 506'. This can be accomplished by configuration of the local machines with a list of local servers, which it tries in ordered succession until local streaming is successful, or if not successful after the entire list has been exhausted, which it then follows by reversion to the original remote media server for streaming of the selected content. For example, a web page may originally be linked to a video file at a remote server, e.g., cnn.com:VF. By reconfiguration of the local machine, a similar video file at a first in order of priority local server, cnn.locall .com:VF receives the request for streaming. If the first in order local server has the requested file, the streaming request is filled, completing execution. If the first in order local server is not able to satisfy the streaming request, the next in order local or regional server is provided with the streaming request, until the list of alternate servers is exhausted and reversion to the original server occurs. Upon successful central streaming, or even upon completion of an unsuccessful central streaming attempt, operation ends 508.

What is claimed is:

1. A method for a streamed performance at a client location, comprising:

transmitting a first request from a local client machine for a performance of a time-varying media content to be streamed at the local client machine, the first request being addressed to an address that is designated in a configuration file of the local client machine and that corresponds to a selected media server in a regional network;

when the first request for the performance at the local client machine is unsuccessful:

changing the address that is designated in the configuration file of the local client machine to an address of a central media server at which the selected time-varying media content is centralized at a central media server location;

transmitting a second request from the local client machine for a streamed performance of the time-varying media content, the second request being addressed to the address that is designated in a configuration file of the local client machine;

receiving at the local client machine, in response to the second request, the selected time-varying media content; and transmitting a transmission of the selected time-varying media content from the local client machine, wherein the transmission is addressed to the selected media server in the regional network.

2. The method according to claim 1 wherein an error message received by the local client machine indicates that the first request is unsuccessful.

3. The method according to claim 1, wherein said time-varying media content includes video data.

4. The method according to claim 1, wherein said time-varying media content includes audio data.

5. The method according to claim 1, wherein said regional network is a local area network.

6. A computer-readable medium having computer-executable instructions, which when executed on a processor, direct a computer to perform the method of claim 1.

7. The method of claim 1 wherein the changing the address that is designated in the configuration file comprises sending configuration commands to the local client machine to replace at least one portion of a first stream name identifying the selected media server in the regional network that is designated in the configuration file of the local client machine from which selected media content can be streamed, with a second stream name portion associated with the central media server at which the selected time-varying media content is centralized at the central media server location.

8. The method of claim 1 further comprising selecting a second performance of the time-varying media content to be streamed at a second local client machine from the selected media server in the regional network that is designated in a configuration file of the second local client machine, whereby the streamed performance at the second local client machine from the selected media server in the regional network is successful.

9. The method of claim 1 wherein the changing the address that is designated in the configuration file comprises downloading a new configuration file to the local client machine.

10. The method of claim 1 wherein the changing the address that is designated in the configuration file comprises copying a new file to the local client machine wherein the new file communicates a new configuration to the local client machine.

11. The method of claim 1 wherein the changing the address that is designated in the configuration file comprises a user manually configuring the local client machine.

12. The method of claim 1 wherein the changing the address that is designated in the configuration file comprises an automated scheme managed by a central administrator.

13. The method of claim 1 wherein the changing the address that is designated in the configuration file comprises automatically modifying the name of the selected media server in the regional network in the configuration file of the local client machine by substituting therefore the name of the central media server at which the selected time-varying media content is centralized at the central media server location that is obtained from an HTML link selected by a user of the local client machine.

14. A computer program product, comprising:

a computer storage medium and a computer program code mechanism embedded in the computer storage medium for causing a local client machine in a regional network to transmit a first request for a performance of a time-varying media content to be streamed at the local client machine, the first request be addressed to an address that is designated in a configuration file of the local client machine and that corresponds to a selected media server in a regional network, the computer program code mechanism including:
- a first computer code device configured to recognize when the first request for the streamed performance at the local client machine is unsuccessful; and
- a second computer code device configured, upon an unsuccessful streamed performance at the local client machine, to:
  - change the address that is designated in the configuration file of the local client machine to an address of a central media server at which the selected time-varying media content is centralized at a central media server location;
  - transmit a second request for a stream of a performance of the time-varying media content, the second request being addressed to the address that is designated in a configuration file of the local client machine;
  - receive, in response to the second request, the selected time-varying media content at the local client machine, and
  - transmit a transmission of the selected time-varying media content from the local client machine, the transmission being addressed to the selected media server in the regional network.

15. The computer program product of claim 14 wherein the change the address that is designated in the configuration file comprises sending configuration commands to the local client machine to replace at least one portion of a first stream name identifying the selected media server in the regional network that is designated in the configuration file of the local client machine from which selected media content can be streamed, with a second stream name portion associated with the central media server at which the selected time-varying media content is centralized at the central media server location.

16. The computer program product of claim 14 wherein the change the address that is designated in the configuration file comprises downloading a new configuration file to the local client machine.

17. The computer program product according to claim 14 wherein said regional network is a local area network.

18. The computer program product according to claim 14 wherein an error message received by the local client machine indicates that the first request is unsuccessful.

19. The computer program product of claim 14 wherein the change the address that is designated in the configuration file comprises copying a new file to the local client machine wherein the new file communicates a new configuration to the local client machine.

20. The computer program product of claim 14 wherein the change the address that is designated in the configuration file comprises a user manually configuring the local client machine.

21. The computer program product of claim 14 wherein the change the address that is designated in the configuration file comprises an automated scheme managed by a central administrator.

22. The computer program product of claim 14 wherein the change the address that is designated in the configuration file comprises automatically modifying the name of the selected media server in the regional network in the configuration file of the local client machine by substituting therefore the name of the central media server at which the selected time-varying media content is centralized at the central media server location that is obtained from an HTML link selected by a user of the local client machine.

23. A system for comprising:
- a central media server at which a selected time-varying media content is centralized at a central media server location;
- a selected media server in a regional network in communication with the central media server;
- a local client machine for selecting a performance of the time-varying media content to be streamed at the local machine from the selected media server in the regional network, wherein:
  - the selected media server in the regional network has an address that is designated in a configuration file of the local client machine;
- when the streamed performance at the local client machine from the selected media server in the regional network is unsuccessful:
  - changing the address that is designated in the configuration file to an address of the central media server;
  - transmitting a request from the local client machine to the address designated in the configuration file to stream a performance of the time-varying media content from the central media server at the central media server location;
  - streaming the performance of the selected time-varying media from the central media server location at the local client machine;
  - storing the selected time-varying media content streamed from the central media server location at the local client machine; and
  - copying the selected time-varying media content from storage at the local client machine to the selected media server in the regional network.

24. The system of claim 23 wherein the selected time-varying media content is selected from the group consisting of video content, audio content, and audio-visual content.

25. The system of claim 23 wherein the changing the address that is designated in the configuration file is selected from a group consisting of:
- sending configuration commands to the local client machine to replace at least one portion of a first stream name identifying the selected media server in the regional network that is designated in the configuration file of the local client machine from which selected media content can be streamed, with a second stream name portion associated with the central media server at which the selected time-varying media content is centralized at the central media server location;
- downloading a new configuration file to the local client machine;
- copying a new file to the local client machine wherein the new file communicates a new configuration to the local client machine;
- a user manually configuring the local client machine;
- an automated scheme managed by a central administrator;
- automatically modifying the name of the selected media server in the regional network in the configuration file of the local client machine by substituting therefore the name of the central media server at which the selected time-varying media content is centralized at the central media server location that is obtained from an HTML link selected by a user of the local client machine.

26. The system of claim 23 wherein said regional network is a local area network.

27. The system of claim 23 wherein an error message received by the local client machine indicates that the streamed performance at the local client machine from the selected media server in the regional network was unsuccessful.

* * * * *